2 Sheets—Sheet 1.

F. W. RANDALL.
Grain-Harvester.

No. 226,677. Patented April 20, 1880.

Attest:
M. C. Ludlum.
N. L. Bennett.

Inventor:
F. W. Randall.
By E. B. Whitmore, Atty.

2 Sheets—Sheet 2.

F. W. RANDALL.
Grain-Harvester.

No. 226,677. Patented April 20, 1880.

Attest:
M. C. Ludlum.
N. L. Bennett.

Inventor:
F. W. Randall.
By E. B. Whitmore, Atty.

UNITED STATES PATENT OFFICE.

FRANCIS W. RANDALL, OF BROCKPORT, NEW YORK.

GRAIN-HARVESTER.

SPECIFICATION forming part of Letters Patent No. 226,677, dated April 20, 1880.

Application filed January 22, 1880.

*To all whom it may concern:*

Be it known that I, FRANCIS W. RANDALL, of Brockport, in the county of Monroe and State of New York, have invented a new and useful Improvement in Grain-Harvesters, which improvement is fully set forth in the following specification and accompanying drawings, in which—

Figure 1:
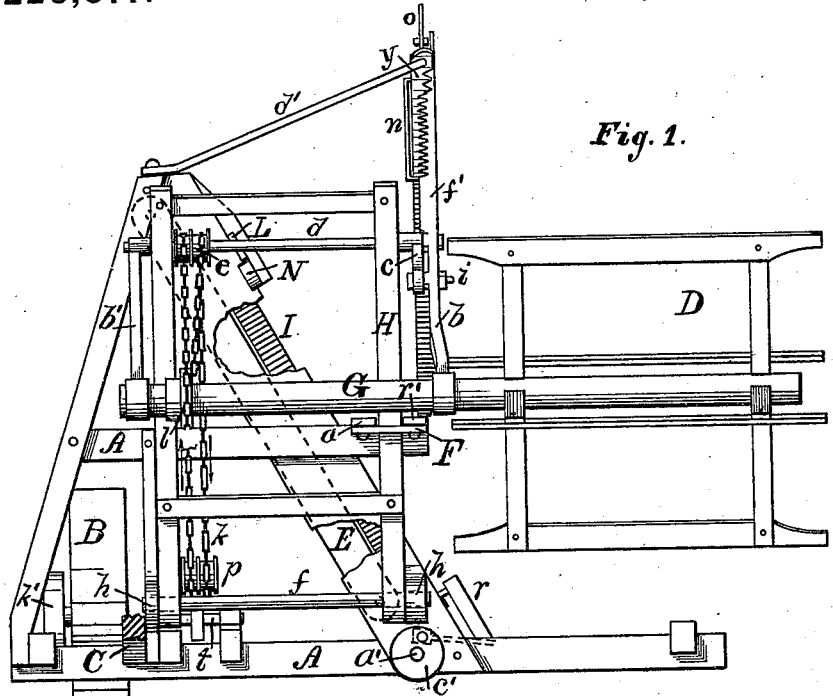
Figure 2:
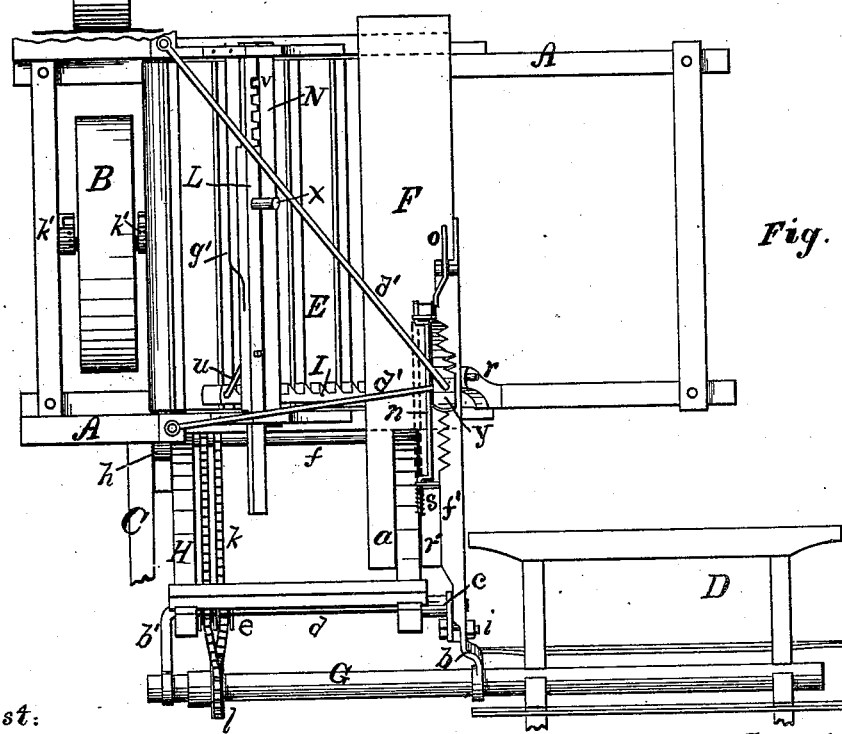
Figure 3:
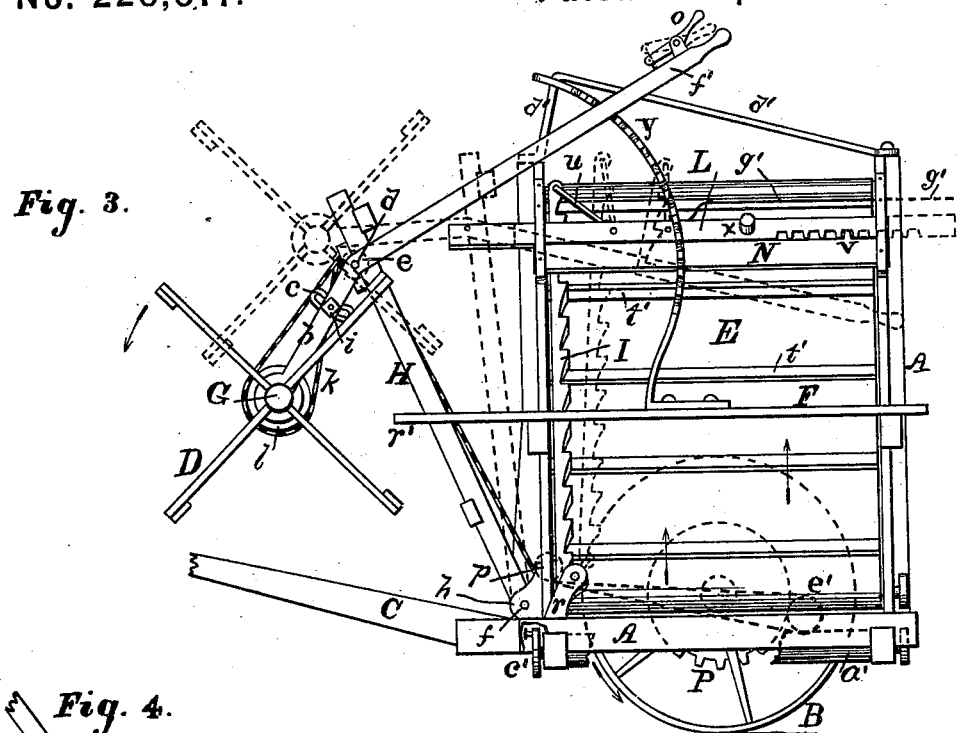

Figure 1 is a front elevation; Fig. 2, a plan; Fig. 3, Sheet 2, a left-side elevation; Fig. 5, a right-side elevation, and Fig. 4 a detail.

The object of my invention is to hang the reel in such a manner that it may be readily adjusted, with reference to the sickle-bar, up or down, or backward or forward, or have its overhanging end dipped toward the ground or raised farther therefrom, as the case may require; to raise and lower the reaper bodily by new and novel means, and to produce other improvements, all hereinafter fully set forth.

In the drawings, A is the frame, B the driving-wheel, C the draft-tongue, D the reel, E the elevating canvas or apron, and F the seat-plank, of an ordinary combined grain harvester and binder. The reel-shaft G is supported by arms $b\ b'$, extending from a horizontal shaft, $d$, supported in bearings at or near the upper end of a boom-frame, H, which frame or boom is hung upon a rod or shaft, $f$, held to the reaper-frame by lugs $h\ h$. The boom H is capable of being brought to a vertical position close by the front side of the main frame A, or of being swung forward at the top so as to overhang the base, in which latter position the reel is carried at a greater distance in advance of the sickle-bar, as shown in Fig. 3.

The reel is rotated by means of a chain, $k$, upon a sprocket, $l$, of the reel-shaft, said chain passing over idlers $e$ upon the shaft $d$, thence downward under other idlers, $p$, upon or near the shaft $f$, and back to the pinion-shaft $t$, near the driving-wheel. The idlers $e$ and $p$, being located upon or near the respective shafts $d$ and $f$, admit of the boom H being swung forward or backward without altering the tension of the driving-chain $k$.

$y$ is a serrated bar rising from the seat-plank F, stayed at the top to the reaper-frame by braces $d'$, said bar being bent, having its concavity toward the reel-shaft, as shown in Fig. 3. $f'$ is a hand-lever within convenient reach of the driver, being an extension of the reel-supporting arm $b$, and bent in such a manner as to cross the bar $y$. This lever $f'$ is also serrated, as shown, the serratures engaging with those of the bar $y$, by means of which the reel and boom are locked or held at any desired position.

By locking the lever $f'$ in one of the upper notches of the bar or lever-rest $y$ the reel will be lowered, or if locked in a lower notch of the rest $y$ the reel will be raised. If the lever be locked to the rest in a notch of the former near the extreme end or handle of the same, the boom will be swayed forward, carrying the reel considerably in advance of the sickle-bar, or if locked in a notch of the lever remote from the handle the boom will be folded back against the main frame, bringing the reel close to the sickle-bar. This gives to the reel a universal movement as regards a vertical plane.

The arm $b'$, Fig. 1, is secured rigidly to the shaft $d$, and a shorter arm, $c$, is also secured to said shaft, pointing in the same direction as the arm $b'$, while the arm $b$ (or lever $f'$) is fitted so as to turn freely upon the shaft $d$.

Figure 4:
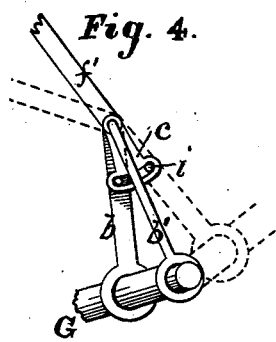
Figure 5:
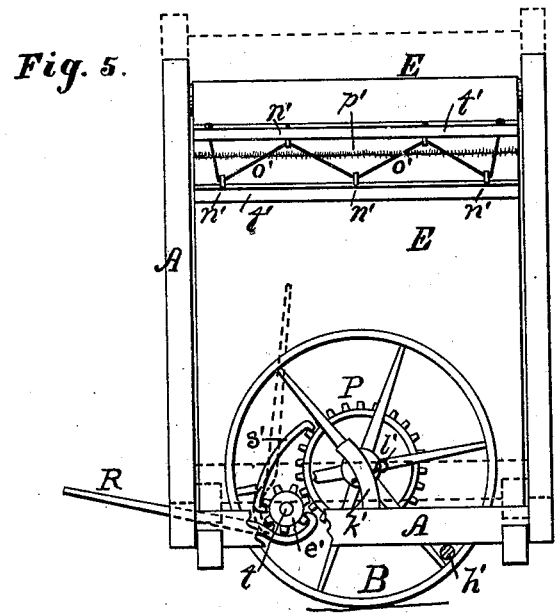

The arm $c$ is expanded at its end into a transverse slot slightly curved concentric with the shaft $d$, as shown in Figs. 3 and 4. $i$ is a bolt passing through said slot and the arm $b$, clamping the two together. If the bolt be loosened, the arm $b$ may be turned to either of the extreme positions shown in Fig. 4, which will cause one or the other of the ends of the reel-blades to pass over the sickle-bar in advance of the others and dip the shaft, as shown.

These capabilities of the reel are of great importance in practice, for if the reaper be moving with the wind the standing grain will lean away from the sickle-bar, and after being cut will not fall properly upon the platform. To remedy this the driver may unlock the reel-tilting lever $f'$ and draw the boom back against the frame, relocking the lever in the upper notch of the rest $y$. This will lower the reel and cause its blades to move farther over the platform and counteract the effect of the wind upon the grain, first, by holding it while standing fairly against the sickle-bar, and, second, after being cut laying it more evenly upon the platform.

If the reaper be moving against the wind, the boom may be inclined forward and the reel raised, as the grain will be caused to lean over the cutters by the pressure of the wind and fall to its place upon the platform without so much assistance from the reel.

If the grain be permanently inclined (lodged) toward the right or left as regards the line of advance of the reaper, it may be straightened in front of the sickle-bar and brought upon the platform in much better shape by skewing the reel one way or the other, as shown in Fig. 4, to suit the circumstances of the case.

To hold the lever $f'$ against the rest $y$ a crank-shaped rod, $n$, Figs. 1 and 2, is employed, attached to the lever parallel with the same, and held in hangers just outside of or over the notches of the said lever. This rod is held against the blank edge of the rest $y$, forcing a notch of the same into a notch of the lever, by means of a spring, $s$, and to throw the rod back from the lever-rest and unlock the lever a thumb-piece, $o$, is employed, by pressing which the crank-rod $n$ is rotated in its bearings back away from the rest $y$, as indicated by dotted positions in Figs. 2 and 3. If the thumb-piece $o$ be released, the spring $s$ will immediately rotate the rod $n$ against the rest $y$ and lock the lever $f'$, as shown in Fig. 2.

I is a notched bar lying parallel with the elevating-canvas E, and operated in a manner to move the cut grain endwise as it is being carried upward, for the purpose of presenting it centrally to the binder. The lower end of this grain-adjusting bar is held upon a crank of suitable throw, one end of which crank is journaled in a post, $r$, (shown rising obliquely from the reaper-frame,) said crank being rotated to operate the adjusting-bar by being connected with some suitably-moving part of the reaper. At the upper end the grain-adjuster I is held at the end of a crank-arm, $u$, which is of such comparative length that it does not rotate, but only sways or rocks as the crank below moves said adjuster.

By viewing Fig. 3 it will be seen that as the adjuster I is raised by the crank its upper end will be carried by the arm $u$ to the right, as appearing in said figure, which, pressing upon the butts of the grain, will move said grain in the same direction. The lower end of the rod or arm $u$ is pivoted to a horizontal bar, L, which is capable of endwise adjustment.

N is a rigid bar secured to the sides of the elevating-frame, upon which the bar L rests, and is provided with a tooth, $v$, extending upward into one of several notches cut in the under edge of the bar L, said bar L being fitted to slide in slots formed in the sides of the elevator-frame. The slot at the right-hand end of the bar L is made of sufficient length up and down to allow of the bar being raised off of the tooth $v$ for the purpose of longitudinal adjustment, which the driver effects by means of the handle $x$. The farther the bar L is thrown back or to the right the farther will the top end of the adjuster I incline in the same direction, as indicated by dotted position in Fig. 3. A spring, $g'$, holds the bar L down upon the tooth $v$.

$a'$ is a roller or shaft journaled in the sills of the frame at the bottom of the elevating-canvas E, around which the canvas may pass, which shaft is provided with a crank, $c'$, and pitman for driving the sickle-bar, and is designed to be driven by means of some suitable intermediate gearing connecting it with the driving-wheel.

Fig. 5 shows a manner of raising and lowering the reaper body or frame.

P is a main driving-gear secured to the driving-wheel, and $e'$ a pinion upon the shaft $t$, driven by the gear P, from which shaft $t$ the reel and other working parts of the reaper are driven, said shaft being journaled in boxes attached to the sills of the frame.

R is a spanner-wrench formed to fit upon the teeth of the pinion, as shown, by means of which the pinion may be rotated.

$s'$ is a catch bar or holder, formed substantially as shown, having its ends hooked for the purpose of catching upon the teeth of the pinion and gear to prevent the former rotating back, while the wrench R is loosened to take a new hold upon said pinion.

If the wrench be locked upon the pinion, as shown in full lines, and raised to the dotted-line position, the frame will be raised, as indicated by dotted lines. Now, if the holder $s'$ be applied the frame will be held to its new position while the wrench is being adjusted to lift again. By reversing the operation the frame may be lowered.

During the raising and lowering of the frame it may be necessary to lock the wheel B by a bar, $h'$, thrust through between the frame and a spoke, as shown.

When the frame is brought to the desired position by the above-described means it is permanently secured by means of pins $l'$ passing through the curved hangers $k'$ and their contained journal-boxes, said boxes being fitted to slide in slots in said hangers, which are of ordinary construction.

Fig. 5 also shows a manner of drawing together the two ends of the canvas after the same has been carried around the rollers.

$p'$ is the seam along which the ends of the canvas meet, and $t'$ slats attached to said canvas, many of which, distributed evenly along the canvas, assist to carry the grain upward. The slats $t'$, near the seam, are provided with loops or staples $n'$, through which a cord, $o'$, is interlaced between the slats, holding them together by its tension, the ends of the cord being made fast in one of the slats. By tightening the lacing-cord the canvas will be drawn tightly around the rollers.

There are to be two elevating-canvases, as is usual upon elevating-harvesters, up between which the straw is carried to the binder. The grain-adjuster I, which may be an endless belt upon pulleys instead of a bar, as shown, is designed to operate between the outer and inner canvases upon the grain, as above described.

The seat-plank F is bifurcated at its front end, the two branches $a$ and $r'$ of which act as guides for the boom as it is swayed forward and backward for the purpose of maneuvering the reel, as above set forth.

I claim as my invention—

1. The combination, with the reel-shaft G, shaft $d$, and support $b'$, of the slotted arm $c$ and adjustable support $b$, with a fastening, $i$, by means of which combination the said reel-shaft may be dipped or thrown askew, as set forth.

2. In combination with the reel-shaft G and frame H, a driving-chain, $k$, for the reel, passing over idler-pulleys $p$ and $e$, placed respectively on or near the pivotal shafts $f$ and $d$, for the purpose set forth.

3. In combination with the frame H, a bifurcated seat-plank F, the branches $a$ and $r'$ of which form guides for said frame, substantially as shown.

4. The combination of the notched bars I and L and the connecting-rod $u$ with the fixed bar N, provided with a tooth, $v$, substantially as described.

5. A locking device for the lever $f'$ and rest $y$, consisting of a bent shaft, $n$, resting in suitable hangers, and provided with a spring, $s$, and an operating device, $o$, for said locking device, substantially as described.

6. A lever, R, and catch-bar $s'$, in combination with the gear P and pinion $e'$, for the purpose set forth.

FRANCIS W. RANDALL.

Witnesses:
C. A. SHERWOOD,
WM. B. SYLVESTER.